UNITED STATES PATENT OFFICE.

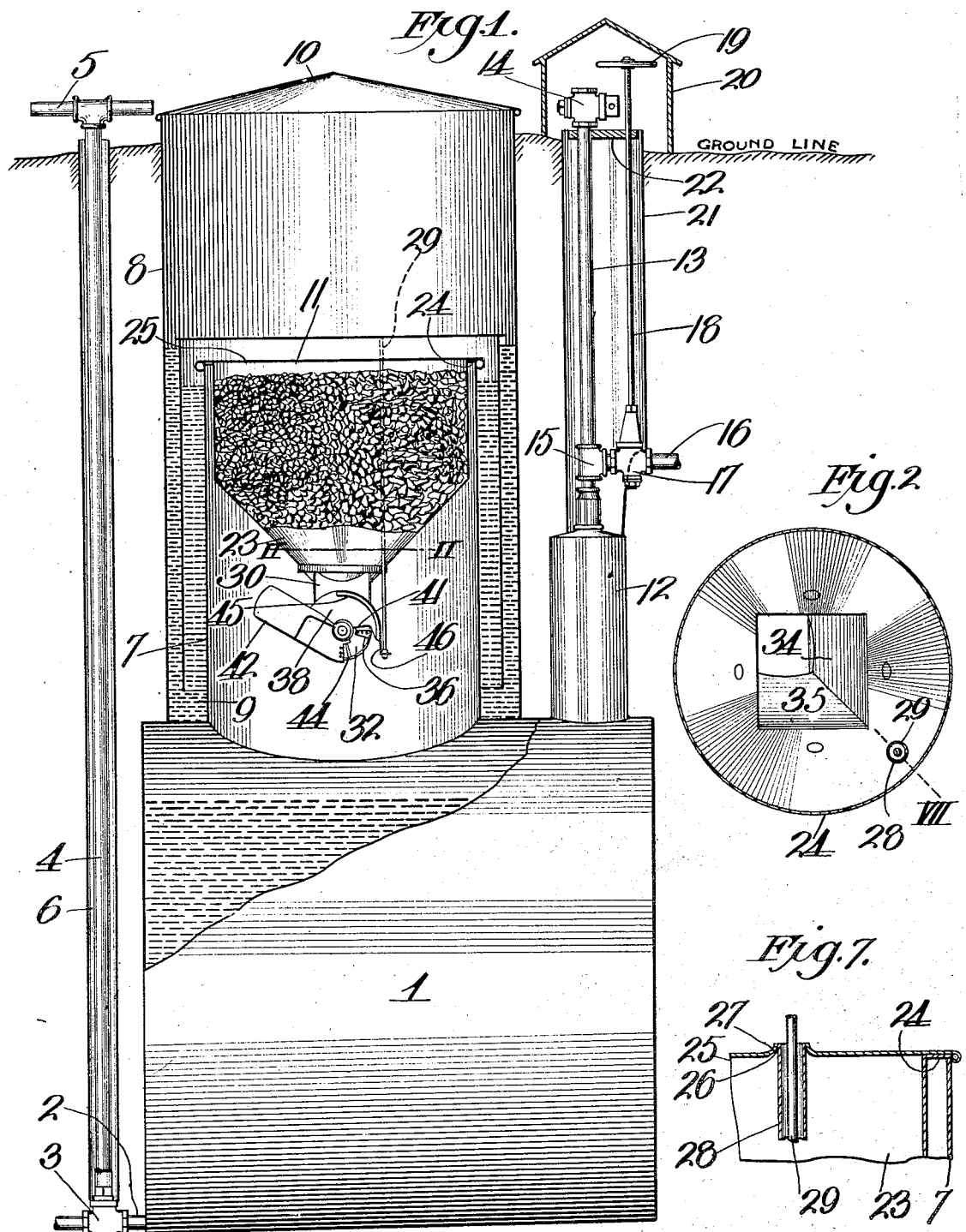

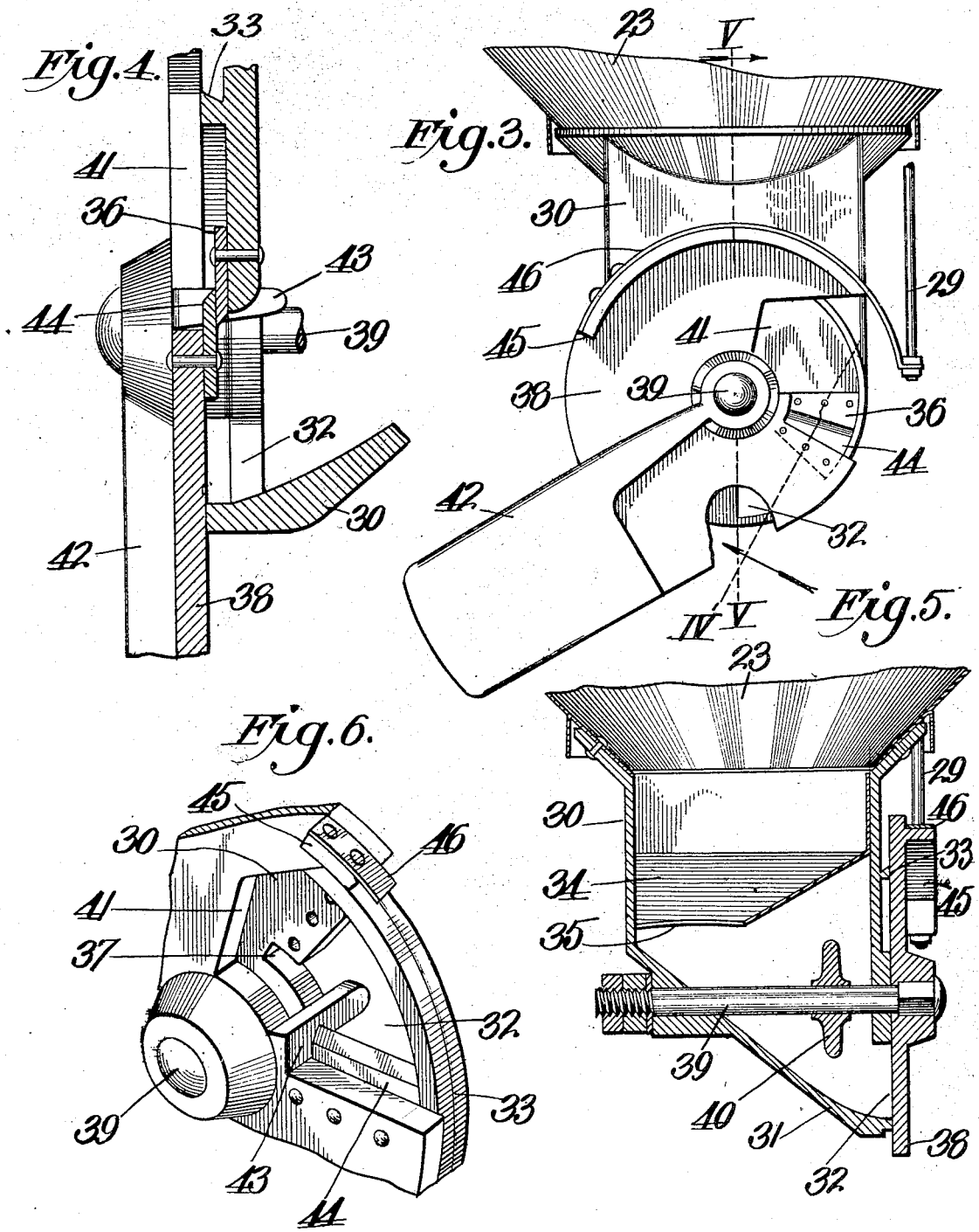

CHARLES W. NUSS AND WILLIS E. NUSS, OF CARROLLTON, MISSOURI.

ACETYLENE-GAS GENERATOR.

1,057,765.  Specification of Letters Patent.  Patented Apr. 1, 1913.

Application filed April 1, 1912. Serial No. 687,848.

*To all whom it may concern:*

Be it known that we, CHARLES W. NUSS and WILLIS E. NUSS, citizens of the United States, residing at Carrollton, in the county of Carroll and State of Missouri, have invented certain new and useful Improvements in Acetylene-Gas Generators, of which the following is a specification.

This invention relates to acetylene gas generators and our object is to produce an efficient generator of simple, durable and inexpensive construction.

With this general object in view and others as hereinafter appear, the invention consists in certain novel and peculiar features of construction and organization as hereinafter described and claimed; and in order that it may be fully understood reference is to be had to the accompanying drawings, in which—

Figure 1, is a view partly in central vertical section and partly in side elevation of a generator embodying my invention. Fig. 2, is an enlarged section on the line II—II of Fig. 1. Fig. 3, is an elevation of the lower end of the carbid hopper. Fig. 4, is a section on the dotted line IV of Fig. 3. Fig. 5, is a section on the line V—V of Fig. 3. Fig. 6, is a perspective view of a part of the valve or cut-off mechanism for the hopper. Fig. 7, is an enlarged section on the dotted line VII of Fig. 2.

In the said drawings, 1 indicates a water tank adapted as usual in this class of apparatus to be buried in the ground, this tank being preferably in the form of a cylinder, and projecting from one end of the cylinder at its lowest point is a pipe 2. If this pipe is used for drainage purposes, it will be equipped with a valve 3 engaged by a key 4, projecting above the surface of the ground and provided with a handle 5 by which it may be conveniently turned, and the key 4 will be inclosed in a sleeve 6, whereby it will be prevented from freezing in the ground. If desired the pipe 2 may constitute a connection between the cylinder and a pump, not shown, whereby the liquid contents of the tank may be pumped therefrom.

7 indicates a vertical cylinder rising from and communicating with the tank, and 8 a larger cylinder arranged concentrically around cylinder 7 and extending from the tank to the top of the ground, the space or chamber 9 between the cylinders 7 and 8 being adapted to be charged with water containing an anti-freezing mixture, and said cylinder 8 is provided with a removable cover 10.

11 indicates an inverted tank constituting a gas bell, this gas bell fitting over cylinder 7 and depending into the water in chamber 9, which water thus forms the customary seal for guarding against the escape of gas from the bell.

12 is a gas filter mounted upon tank 1 at one side of cylinder 8 and 13 a pipe extending upwardly therefrom and provided above the level of the ground with a cock 14. Near the top of the filter, pipe 13 is provided with a T-coupling 15 from which leads a service pipe 16, for supplying gas to light fixtures, not shown. The service pipe is equipped with a cock 17 having a stem 18, extending above the ground and equipped at its upper end with a handle 19.

20 is a hood covering the cock 14 and handle 19 to protect the same without completely isolating the outside air therefrom, and 21 is a casing enveloping pipe 13 and stem 18, from the upper end of the filter to the ground line, the part 22 of the casing being preferably made heavy to constitute a guide and support for the upper ends of said pipe and stem. This casing is provided to protect the inclosed parts from contact with the earth which is tamped around the same and tank 1, cylinder 8 and casing 6 after said parts are secured in operative position in the ground.

23 is a carbid hopper of any desired capacity, suspended in any suitable manner in cylinder 7, the hopper being shown as provided with an outwardly-projecting flange 24 at its upper end resting on the upper end of the cylinder, and covering the upper end of said cylinder and said hopper is a removable cap 25. At a suitable point this cap is provided with an opening 26, the opening being formed by punching the material upward so as to provide a wall 27, whereby water produced by condensation in the bell, is prevented from draining from said cap into the carbid in the hopper.

28 is a tube extending through the hopper and secured at its upper end in the tapered portion 27 as shown clearly in Fig. 7, this tube extending down through the charge of carbid, and extending loosely through said tube is a rod 29, for a purpose which hereinafter appears.

Referring now to the valve construction, 30 is a shoe flared at its upper end and secured to the lower end of the hopper 23 and provided with a sloping bottom 31 and a discharge opening 32 in the lower end of the front wall of the shoe, said opening being disposed at one side of the center of the shoe, as shown most clearly in Figs. 3 and 6, and projecting outwardly from said wall is a grooved flange 33, to receive moisture flowing down the side of the cylinder and shoe and discharge it into the underlying tank 1 instead of permitting it to work its way through opening 32 into the shoe where it will come in contact with the carbid therein.

34 is a partition in the shoe above opening 32 which slopes downwardly and inwardly from the wall containing said opening and the side wall nearest said opening so as to provide a throat 35 for directing the carbid into the bottom of the shoe at one side of said opening instead of directly opposite the said opening, the downward slope of the partition further serving to guard against the lower part of the shoe being completely filled, which would of course result in the carbid packing more or less opposite opening 32, and in this connection it is desired to state that the partition 34 will probably be of sheet metal and vary in size so that the same shoe can be used in connection with hoppers of different capacity, that is to say, by varying the size of the partition the throat 35 is made larger or smaller and hence acts to control the quantity of carbid which accumulates in the bottom of the shoe. The upper side or end of the opening 32 carries a shearing blade 36, (omitted in Fig. 6), and inward of said blade the opening is formed with an extension or slot 37.

38 is a disk valve fitting flatly against the periphery of the grooved flange 33, and secured rigidly on one end of a shaft 39, extending into or through the lower part of the hopper centrally thereof, and said shaft bears a journaled relation to the hopper and is equipped with a carbid agitator or stirrer 40. The valve is provided with an opening 41, adapted when the valve is open, to register with opening 32, and with a weighted arm 42 for normally holding the valve in closed position, as shown most clearly in Figs. 3 and 4, and to limit the closing movement of the valve under the gravitative action of arm 42, a finger 43 projects through opening 32 in the shoe and is adapted to enter slot 37 and engage the closed end of the same. Outward of the stop finger 43 a shearing blade 44 is secured to the inner side of the valve at the lower end of the opening thereof, and is adapted as the valve closes, to shear past the lower edge of shearing blade 36 and to slightly overlap and fit flatly against said blade when the valve is completely closed. The valve is provided with a peripheral flange 45 and fitting upon the same and secured at one end thereto is a flexible metal strap 46 which is secured at its opposite end to the lower end of rod 29.

Assuming that the parts are in the position shown in Fig. 1, it will be seen that the gas bell occupies its most depressed position and has therefore depressed rod 29 and through the connection of the same with the strap 46 has opened the valve, and that in such opening movement, the agitator 40 has been turned to loosen—if necessary—the carbid in the lower part of the shoe in order that part of the same may fall through the registering openings 32 and 41 of the shoe and valve respectively, and fall into the water with which tank 1 is charged. As this occurs the generation of gas begins and it passes up through tube 28 into the upper part of the holder or bell and raises the same, the valve at the same time through the force of gravity, closing and sliding the rod 29 upward through the guide or tube 28. Under pressure of the bell the gas will pass to the burners through the service pipe and as it is consumed the bell will descend until it again opens the valve by imparting downward movement to the rod 29 and effects the disposition of a second charge of carbid into the tank, and in this connection it will be noticed that upon each closing as well as upon each opening action of the valve, the carbid in the lower part of the shoe is stirred or agitated.

The operations described are repeated until the entire charge of carbid in the hopper is exhausted. The operator then closes the gas cock 17 by the operation of handle 19, removes cover 10 and opens air cock 14. The gas bell may then be removed to permit cap 25 and the hopper to be removed and cleaned if necessary. At this time it is also well to stir the water in the tank and drain or pump the same with the carbid residuum therefrom. The tank is then refilled to about the level indicated, the removed parts are replaced, and if necessary, a small quantity of water may be placed in chamber 9 so as to maintain the level of the same at the proper height, as there will be a small loss from evaporation. Cock 14 is then opened to permit the air in the generator to pass out and if necessary, the burners may be opened for the same purpose. The bell will descend immediately through force of gravity and start the generation of gas by effecting the opening of the valve, the cock 14 being reclosed and the burners also if it is not desired to use the same at the time.

By providing the upper end of the shoe opening 32 with the shearing blade and the lower end of the opening 41 of the valve with a similar blade, provision is made for cutting any small pieces of carbid which might lodge in the path of said blades as the same come together. Of course when the carbid is perfectly fresh such particles may be hard enough to temporarily prevent the complete closure of the valve but such particles will soften in a very short time through the moisture in the surrounding gas and as they soften they will be severed cleanly and the valve will complete its closing operation. Without provision for this shearing action the valve would be apt to remain open for an undesirable period of time and hence expose part of the carbid in the lower end of the shoe to contact with the moisture contained in the gas, under which exposure part of the carbid would deteriorate.

From the above description it will be apparent that we have produced an acetylene gas generator embodying the features of advantage enumerated as desirable in the statement of the object of the invention and we wish it to be understood that while we have illustrated and described the preferred embodiment of the invention we do not desire to be restricted to the exact details of construction shown and described as obvious modifications will suggest themselves to one skilled in the art.

We claim:

1. In an acetylene gas generator, a water tank, a cylinder superposed thereon and communicating therewith, a cylinder surrounding the first-named cylinder and closed at its bottom to provide a liquid seal chamber surrounding the first-named cylinder, a gas bell around the first-named chamber and depending into said liquid seal, a hopper depending into said first-named cylinder, an upright tube extending through the hopper, a cover for the first-named cylinder and hopper, provided with an opening receiving the upper end of said tube, the covering being punched upwardly around and adjacent to the tube, a shoe depending from and communicating with the hopper and provided with a discharge opening, a circular valve pivoted to the shoe and provided with an opening, yielding means tending to hold the valve with its opening out of register with the opening of the shoe to prevent discharge of carbid therefrom, an arcuate flange projecting from the circular valve, a flexible strap peripherally engaging said flange and secured at one end thereto, and a reciprocatory rod extending slidingly through said tube and attached at its lower end to said strap and normally held projected upwardly beyond the cover of the hopper and first-named cylinder when the valve is closed and adapted to be depressed by the gas bell when the same occupies its most depressed position to open the valve to dispose its opening in register with the opening of the shoe.

2. An acetylene gas generator, comprising a shoe having a sloping bottom, and a discharge opening in the wall toward which said bottom slopes, a downwardly-sloping partition in the shoe above said opening to discharge into the lower portion of the shoe at one side of the opening, a valve fitting against the wall of the shoe provided with the opening and provided with an opening, and means for yieldingly holding the valve closed and the opening thereof out of register with the opening of the shoe.

3. In an acetylene gas generator, a shoe having a sloping bottom, and a discharge opening in the wall toward which said bottom slopes, a downwardly-sloping partition in the shoe above said opening to discharge into the lower portion of the shoe at one side of the opening, a valve fitting against the wall of the shoe provided with the opening and provided with an opening, means for yieldingly holding the valve closed and the opening thereof out of register with the opening of the shoe, a flexible strap secured peripherally to the valve, and means connected to the strap for rotating the valve until its opening registers with that of the shoe.

4. In an acetylene gas generator, a shoe having a sloping bottom, and a discharge opening in the wall toward which said bottom slopes, a downwardly-sloping partition in the shoe above said opening to discharge into the lower portion of the shoe at one side of the opening, a valve fitting against the wall of the shoe provided with the opening and provided with an opening, means for yieldingly holding the valve closed and the opening thereof out of register with the opening of the shoe, a flexible strap secured peripherally to the valve, means connected to the strap for rotating the valve until its opening registers with that of the shoe, and an agitator rotatable with the valve and arranged within the shoe to agitate or stir the carbid therein.

5. In an acetylene gas generator, a shoe having a sloping bottom and a discharge opening in the wall toward which the bottom slopes, a downwardly-sloping partition in the shoe above said opening to discharge into the lower portion of the shoe at one side of the opening, a valve fitting against the wall of the shoe provided with the opening and provided with an opening, means for yieldingly holding the valve closed and the opening thereof out of register with the opening of the shoe, and an agitator within the shoe and rotatable with the valve for agitating the carbid in the lower part of the shoe.

6. In an acetylene gas generator, a shoe having a sloping bottom and a discharge opening in the wall toward which the bottom slopes, a downwardly-sloping partition in the shoe above said opening to discharge into the lower portion of the shoe at one side of the opening, a valve fitting against the wall of the shoe provided with the opening and provided with an opening, means for yieldingly holding the valve closed and the opening thereof out of register with the opening of the shoe, a shearing blade secured to the wall of the shoe provided with the opening, and a coöperating blade secured to the valve and adapted as the latter closes to have a shearing action on the first-named blade.

7. A shoe having a downwardly-sloping bottom and an opening in the wall toward which said bottom slopes at one side of the center of the shoe, a partition within the shoe and sloping downwardly therein to provide a throat for discharging carbid onto the bottom of the shoe so that it shall mainly accumulate against the said wall thereof at the opposite side of its center from the opening in said wall, a circular valve bearing a journaled relation to and normally closing said opening and provided with an opening adapted to register with the opening of said wall, means for rotating the valve to open position, a weighted arm for closing said valve, and a stop projecting from the valve into the shoe through the said opening thereof to limit the closing movement of the valve.

8. In an acetylene gas generator, a shoe having a downwardly-sloping bottom and an opening in the wall toward which said bottom slopes, and a circular peripherally grooved flange projecting outwardly from said wall and inclosing the said opening thereof, a shaft journaled in said wall concentrically of said flange, an agitator secured on the shaft within the shoe, a valve secured on the shaft and fitting flatly against said circular flange and provided with an opening, a weighted arm normally holding the valve with its opening out of register with the opening of said wall, and means for rotating said valve against the resistance of said arm to dispose the opening of the valve in register with the opening in the said shoe.

9. In an acetylene gas generator, a shoe having a downwardly-sloping bottom and an opening in the wall toward which said bottom slopes, and a circular peripherally grooved flange projecting outwardly from said wall and inclosing the said opening thereof, a shaft journaled in said wall concentrically of said flange, an agitator secured on the shaft within the shoe, a valve secured on the shaft and fitting flatly against said circular flange and provided with an opening, a weighted arm normally holding the valve with its opening out of register with the opening of said wall, means for rotating said valve against the resistance of said arm to dispose the opening of the valve in register with the opening in the said shoe, a shearing blade rigid with the said wall at the upper end of the said opening thereof, and a shearing blade attached to the valve at the lower end of the opening thereof and adapted to have a shearing relation with the first-named blade as the valve is closed.

In testimony whereof we affix our signatures, in the presence of two witnesses.

CHARLES W. NUSS.
WILLIS E. NUSS.

Witnesses:
  ORAL B. FLAGG,
  DOLPH MAUPIN.